Feb. 11, 1941.   J. D. FERRY   2,231,114
COOKING APPARATUS
Filed Sept. 20, 1937   2 Sheets-Sheet 2
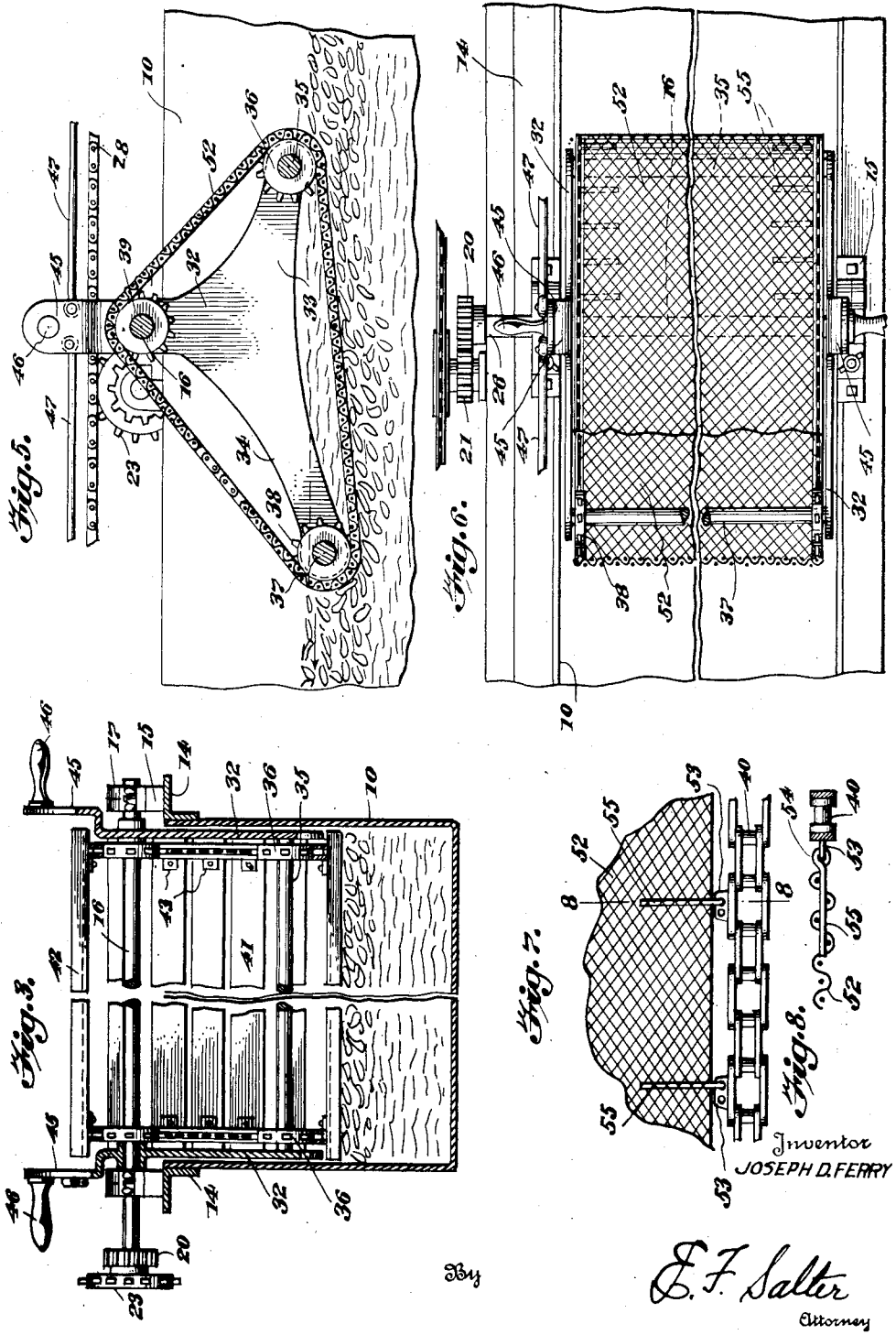
Inventor
JOSEPH D. FERRY
By
E. F. Salter
Attorney Patented Feb. 11, 1941

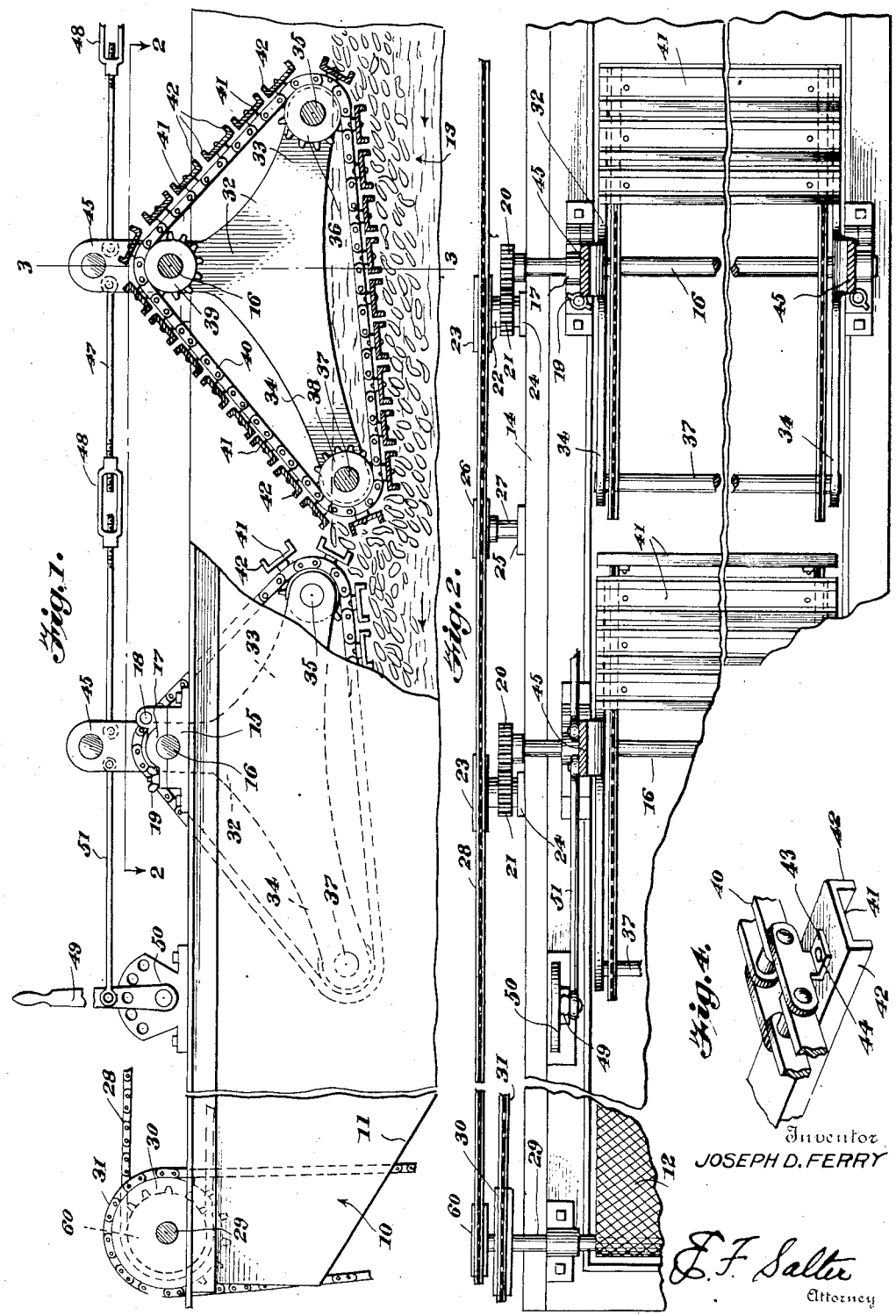

2,231,114

UNITED STATES PATENT OFFICE 2,231,114

COOKING APPARATUS

Joseph D. Ferry, Harrisburg, Pa.; Sylvia O. Ferry executrix of Joseph D. Ferry, deceased Application September 20, 1937, Serial No. 164,785

4 Claims. (Cl. 53—7)

This invention relates to food treating apparatus, particularly to apparatus designed for cooking vegetables of small bulk or in comminuted form, such as potato slices in producing potato chips. An apparatus of the general type to which this invention appertains is disclosed in my prior Patent No. 2,056,845, granted October 6, 1936.

This application is a continuation as to all common subject matter disclosed in my prior copending application Serial No. 114,054, filed December 3, 1936.

In the cooking of potato chips, such factors as the rate of progression of the slices through the body of cooking liquid, the position of individual slices, the extent to which they are submerged in the liquid and the duration of such submergence, play an important part in determining the quality of the product. If the slices do not receive uniform treatment in the cooking operation the chips will vary as to color and crispness.

It is highly desirable to produce chips of substantially uniform character and appearance, especially as such chips are marketed principally in packages or containers of transparent material.

An object of the present invention is to provide a cooking apparatus having novel food impelling means for conveying articles of food through a body of cooking liquid and maintaining such articles uniformly submerged in the liquid while being conveyed.

Another object is to provide in such an apparatus a plurality of serially arranged impellers adjustable in unison, or individually relative to each other, to vary their effective food engaging and conveying angles relative to the major axis of travel of the food articles through the cooking liquid.

A further object is to provide potato chip cooking apparatus impeller means operable to advance a mass of slices in a body of cooking liquid through a series of successive zones in each of which the slices are impelled along forwardly and downwardly inclined paths while completely submerged; the zones being staggered whereby to effect a reversal of the slices in passing from one zone to the next.

A still further object is to provide impeller mechanism for potato chip cooking apparatus by which the slices are successively moved forwardly and downwardly beneath the surface of a body of cooking liquid at intervals, whereby slices as they rise toward the surface of the liquid are carried forwardly and downwardly ahead of the following rising slices.

Other objects will be apparent from the description.

In the drawings, wherein like reference characters indicate like parts throughout the several views:

Figure 1 is a side elevation, partly broken away, of a cooking apparatus embodying the present invention.

Figure 2 is a partial top plan view thereof, sectioned on line 2—2 of Figure 1.

Figure 3 is a vertical transverse section on the line 3—3 of Figure 1.

Figure 4 is a fragmentary perspective view of an impeller detail.

Figure 5 is a fragmentary longitudinal section through a cooking apparatus equipped with an alternative structural embodiment of impeller.

Figure 6 is a top plan view of the embodiment shown in Figure 5.

Figure 7 is an enlarged fragmentary plan view illustrating a detail of the impeller shown in Figures 5 and 6.

Figure 8 is a transverse section on the line 8—8 of Figure 7.

The apparatus as shown comprises a cooking kettle 10 of the construction disclosed in my aforesaid prior copending application, having an upwardly inclined bottom 11 at its outlet end associated with an endless belt foraminous conveyor 12 by which the cooked chips are removed from the body of cooking liquid 13, such as oil, within the kettle. The kettle is heated by means not shown, and preferably has a sloping bottom, also not shown, which increases in depth toward the outlet end, all as disclosed in my aforesaid prior copending application.

Along each upper longitudinal edge of the side walls of the kettle there is suitably secured an angle rail 14 having its upper flange directed laterally outward from the kettle and flush with the upper edge of the wall. Split bearings 15 are secured to the lateral rail flanges at intervals spaced longitudinally of the kettle, arranged as transversely aligned pairs in which are journalled impeller drive shafts 16. The upper sections 17 of these bearings are hinged as at 18 to the lower sections and secured by wing nuts 19 so that the upper bearing sections may be swung back to permit ready removal of the shafts 16 when desired.

At one side of the kettle each impeller shaft 16 extends laterally beyond the rail 14 and mounts a fixed pinion 20 at its end. The pinions mesh with pinions 21 fixed to stub shafts 22 driven by sprockets 23 and mounted in brackets 24 arranged at the side of the kettle in the manner shown in Figure 2 of my said prior copending application Serial No. 114,054. Similar brackets 25, only one of which is shown in Figure 2, carry idler sprockets 26 on stub shafts 27. A drive chain 28 is trained over the sprockets 23 and 26 and over a sprocket 60 fixed to a transverse driving shaft 29 at the outlet end of the kettle. Shaft 29 drives the belt conveyor 12 and has fixed thereto a sprocket 30 driven by a chain 31 from a source of power, not shown. As the shaft 29 is rotated by means of its chain and sprocket connection with the power source, it is obvious that the conveyor 12 and the impeller drive shafts 16 will be driven in unison.

Each impeller drive shaft 16 mounts an impeller unit comprising a pair of transversely aligned side frames 32 pivotally suspended within the kettle from the shaft 16 to swing in close proximity to the adjacent side walls of the kettle. In the embodiment herein disclosed each side frame 32 is of substantially triangular configuration, comprising a flat vertically disposed plate having at its base portion a rear leg 33 extending in the direction of the inlet end of the kettle and a front leg 34 extending in the direction of the outlet end. The tips of the rearward legs 33 provide bearings in which is journalled a shaft 35 transversely of the kettle. A sprocket 36 is fixed to the shaft 35 inwardly of and in close proximity to each side plate. Similarly, the tips of the front legs 34 provide bearings for a transverse shaft 37 having likewise fixed thereto sprockets 38. Sprockets 39 are fixed to the drive shaft 16 to cooperate with the sprockets 36 and 38; the three sprockets 36, 38 and 39 adjacent each side frame 32 being in a common vertical plane and having trained thereover an endless chain 40. Impeller paddles in the form of channel irons 41 are secured to the chains in closely spaced relation over the entire extent of the chains with the side flanges 42 of the channels being directed outwardly.

The channel paddles 41 are secured to the chains in the manner shown in Figure 4. One side piece of every other link in the chain is formed with an integral ear directed laterally to provide a perpendicular attaching lug 43 to which the bottom of a channel 41 is attached, as by a rivet 44.

As best shown in Figure 3, each side frame plate 32 is integrally continued above its point of pivotal suspension from its shaft 16 as a laterally offset upstanding lever 45. The offset is laterally outwardly of the kettle so that each lever 45 is disposed over the adjacent side rail 14, thus providing sufficient clearance for the ends of the channel paddles 41 which extend from the sides of the chains 40 almost to the adjacent side walls of the kettle in order to prevent passage of potato slices around the ends of the impeller paddles. Lifting handles 46 are carried by the upper ends of the levers 45 so that when the split bearings of any impeller unit are swung open as previously described, the entire unit may be lifted vertically from the kettle for cleaning or repair.

At one side of the kettle each impeller unit lever 45 is connected to the next adjacent unit lever by a turnbuckle rod 47 pivotally connected at its ends to the respective levers and adjustable by means of the turnbuckle 48 to vary its length. At one end of the kettle a control lever 49 is mounted for releasable latching engagement with a quadrant 50 in a known manner, and an actuator rod 51 is pivotally connected at one end to the control lever and at its other end is pivotally connected to the adjacent impeller unit lever 45. It will be obvious that as the control lever is manipulated the respective impeller unit levers 45 will be correspondingly oscillated on their pivot fulcrums comprising the shafts 16 to move in unison and through identical arcs of movement.

The setting of any impeller unit relative to its axis of rotation may be individually altered relative to the setting of the other units by adjusting the turnbuckles 48 to shorten or increase the length of the rods 47 to the required degree.

In the form of impeller shown in Figures 5 to 8 all structural details identical with those previously described are identified by the same reference characters, rendering repetition of descriptive matter unnecessary. In this embodiment the impeller paddle structure differs, the channeled paddles being replaced on the chains 40 by an endless foraminous belt, preferably a wire fabric belt 52. The manner of attaching the belt 52 to the chains 40 is shown in Figures 7 and 8. At suitably spaced intervals certain links of the chains 40 have their side pieces provided with a laterally extending lug 53 apertured for connection with an eye 54 at the outer end of a pin 55 woven laterally inwardly through the meshes of the fabric at the side edges of the belt, thus providing a flexible connection between the belt and chains, and one that is readily detachable.

An important feature of the invention resides in the fact that the axes of the parallel shafts 35 and 37 in the leg portions of each impeller unit are disposed normally in a plane that is inclined or angled with respect to the horizontal axis of the travel of the potato slices longitudinally of the kettle from inlet to outlet. In this normal operating position of the parts, as shown in Figures 1 and 5, the impeller unit levers 45 are in a vertical position, the front leg carried shafts 37 being but very slightly below the level of the cooking liquid and the rear leg carried shafts 35 being disposed appreciably thereabove. Due to the position of the shafts 37 the lower flight of each endless impeller will enter the cooking liquid at a downwardly and forwardly inclined angle approximately midway between the sprockets 36 and 38 and will be completely submerged beneath the liquid at the sprockets 38 of the forward leg portions of the side frames.

The path of travel of the lower flight of the impeller is parallel to a plane passed through the axes of the shafts 35 and 37 in each impeller unit. The drive of the mechanism is such that the impeller drive shafts and drive sprockets are rotated clockwise with respect to Figures 1 and 5 so that the impellers move the mass of slices forwardly through the kettle in the direction of the arrows in Figure 1, from inlet end to outlet end, positively engaging the uppermost slices and moving them while so engaged forwardly and downwardly beneath the cooking liquid and at the same time sliding the uppermost slices over and ahead of those beneath.

This action of the impellers effectively insures against stratification of the slices and prevents agglomeration. Also, it assures complete and uniform submergence of all the slices as they travel through the kettle, giving a uniform product.

It is further a feature of the invention that the impeller units are serially arranged longitudinally of the kettle in end to end relationship, the ends of the units being somewhat spaced apart.

By virtue of this arrangement the mass of slices are moved forward through the kettle through successive zones in each of which they are totally and uniformly submerged in the cooking liquid and are positively moved forwardly and downwardly. These zones are spaced apart by turning zones in which the slices are permitted to rise to the top of the cooking liquid in the areas between the points at which the endless impellers leave the cooking liquid and the points at which the next forward impellers enter the liquid.

The impetus given the slices as the impellers leave the cooking liquid combined with their upward rise through buoyancy serves effectively to cause the slices to turn over between the time they pass from beneath one impeller and the time they are engaged by the next.

The rate of progression of the slices as well as the depth and duration of their complete submergence may be regulated at various points in the kettle by individual adjustment of the setting of the impeller units. For example, with reference to Figure 1, the right hand impeller unit may be swung on its axis of rotation on the shaft 16 by manipulating the turnbuckles 48 either to depress or elevate the forward end of the unit to increase or decrease the angle of inclination at which the lower flight of the endless impeller enters the cooking liquid and thus correspondingly alter the depth to which the impeller submerges the slices as well as the duration of submergence.

Likewise, the setting of all units may be altered in unison by appropriate manipulation of the control lever 49, whereby each unit moves simultaneously and identically. This adjustment may be accomplished without affecting the continuous operation of the impellers as the unit frames 32 swing freely on the shafts 16 independently of the rotation of the shafts while driving the sprockets 39.

Having thus described the invention, what is claimed is:

1. A food treating apparatus comprising a receptacle for treating liquid, a series of endless belt food impellers therein with their lower flights submerged at the front end beneath the liquid and elevated at the rear end above the liquid, and each of said impellers being adjustable relative to the others to vary the extent of submergence of their lower flights.

2. A food treating apparatus comprising a receptacle for treating liquid, a series of endless belt food impellers therein in end to end relation, said impellers having their lower flights inclined from a point above the liquid at one end to a point below the liquid level at the other end, means operable to change the inclination of said impeller flights in unison, and means adjustable to vary the inclination of individual flights relative to each other.

3. In a cooking apparatus, a kettle for cooking oil, a driven shaft supported across the kettle top, a frame freely rotatable on said shaft and pivotally suspended therefrom within the kettle, said frame having outward lateral offsets extending over and above the sides of the kettle, a lever on the outer ends of the offsets and clear of the kettle interior, an endless belt impeller carried by said frame within the kettle in operating connection with said shaft, and means on said frame guiding the lower flight of the impeller at an angle down beneath the surface of the oil from a point thereabove.

4. In a cooking apparatus, a kettle for cooking oil, a driven shaft supported across the kettle top, a frame comprising a pair of planar substantially triangular side plates pivotally and freely suspended at their apex portions from said shaft and depending within the kettle closely adjacent the side walls thereof, shafts connecting the ends of the base portions of said plates and parallel to said top shaft, a sprocket fixed on said driven top shaft, sprockets on said base portion carried shafts, all said sprockets being disposed inwardly of said side plates, endless chains trained over said sprockets, said side plates being continued above their apices in outwardly directed laterally offset portions above and over the sides of the kettle, frame position adjusting levers carried by said offset portions, and a series of closely spaced parallel impeller members secured to said chains and extending transversely thereof entirely across the kettle interior, the ends of said impellers overlying the base ends of said side plates and their offset apex portions and terminating in very slightly spaced relation from the side walls of the kettle.

JOSEPH D. FERRY.